United States Patent Office 3,266,971
Patented August 16, 1966

3,266,971
ACRYLIC LATEX COATING COMPOSITION
CONTAINING AMINE MIXTURES
Charles Hartley Miller, Jr., Old Greenwich, Conn.,
assignor to Formica Corporation, Cincinnati, Ohio,
a corporation of Delaware
No Drawing. Filed Mar. 31, 1964, Ser. No. 356,086
20 Claims. (Cl. 161—251)

This invention relates to a resinous coating composition useful in the preparation of laminating paper. More particularly, this invention relates to a coating resin for thermosetting resin-impregnated laminating paper comprising an acrylic latex, a cross-linking agent for said acrylic latex, and an admixture of trialkyl mono amines. Further, this invention relates to a process for preparing laminating paper employing said coating resin, said laminating paper being suitable in a heat- and pressure-consolidated decorative laminate.

Laminating paper is widely used in the manufacture of laminated articles as a decorative surface layer. Such laminated articles are generally intended for use either as horizontal working surfaces, such as table, counter, and bar tops, or as vertical decorative surfaces such as decorative panels, cabinet facings, and the like.

As a preliminary step in the manufacture of finished laminated articles, a laminating paper is prepared. This paper conventionally has a porous fibrous structure and is printed with a decorative design. In addition, the paper is commonly impregnated with a thermosetting resin for strength and high durability. A surface layer of the resin, often modified with plasticizing agents, is sometimes applied over the print paper and sometimes a substantailly transparent overlay sheet impregnated or coated with a clear resinous composition is used instead of the single resinous surface coating or film. In the case of laminating paper comprising a thermosetting resin-impregnated fibrous sheet coated with a curable resinous film, it is important that the surface resin be applied under certain controlled conditions in order that the laminating paper when dried and heat- and pressure-consolidated with suitable core stock or rigidity-imparting base members will result in a finished laminated article which is free of surface defects such as pits, cracks, spots, haze, and in general has a high degree of clarity and smoothness. Althouh there exists a wide variety of coating resins which not only adhere well to fibrous sheets and also present hard and durable surfaces, achievement of the full range of beneficial properties often depends upon the proper choice of processing conditions for application of the resinous coating to the fibrous sheet. Given a superior coating resin, at least three conditions must be satisfied for full realization of the beneficial properties of these resins.

First, it is necessary that the coating resin be adjusted to a viscosity suitable for application by spraying, roller coating, brushing, dipping, knife coating, and the like. Secondly, the coating resin must be stable for a reasonable duration, i.e., it must have good shelf- or pot-life, and maintain its treating viscosity. Thirdly, the resin must not too rapidly reach a stage of substantial advancement in cure during application to the fibrous sheet. As is well known to those skilled in the art, it is difficult to obtain a smooth surface with a resin of low viscosity since the fibers of the underlying print sheet may in part be exposed and application will be uneven with equipment commonly employed. Moreover, a reasonably stable and constant viscosity coating resin is necessary in order that the preparation of the lamintaing paper may be a continuous proces in the manufacturing operation. Since it is common practice to advance ("B-stage") the resinous coating somewhat, but short of a state lacking the necessary degree of flow for heat- and pressure-consolidation with core stock or base members, it is important that the resin does not advance too rapidly in cure before and during application of the resin to the fibrous sheet.

Amine compounds such as trialkyl mono amines, amine salts and ammonia are commonly employed as thickening agents in the application of emulsion copolymer coatings to fibrous sheets (see, for example, U.S. Patent 3,033,811). And it is also known that tertiary amine salts serve as latent catalysts and are useful in prolonging the shelf-life or pot-life of emulsion copolymer coating compositions as they are made up for use (see U.S. Patent 2,994,676). In addition, it is known that copolymers prepjared from organic solution may be rendered water-soluble, stable, and suitable for baked enamel coatings by treatment with ammonia and particular alkanol amines (see U.S. Patents 2,906,724 and 3,107,227). However, in these applications the amines or ammonia when used alone do not provide the balance of properties necessary to achieve a smooth and non-hazy surface on a finished laminate prepared from suitably cured laminating paper which has been coated with a resin containing these additives. As was mentioned above, these properties are traceable to a proper combination of processing conditions, namely, suitable coating viscosity, good stability and constant viscosity of the resinous coating composition, and a slow rate of cure of the resinous coating composition.

Although some of the prior art amines are useful in providing one or another of these properties in the coating composition, so far as is known no one amine compound will fulfill all three requirements in the preparation of laminating paper. Thus, it has been found that amines having low boiling points, e.g., below about 80° C., volatilize too quickly. And at the other end of the scale, amines having high boiling points, e.g., above about 250° C., such as high boiling hydroxylamines, are difficult to remove in the drying and laminating steps after application of the coating composition of the fibrous sheet. Amines of this character do not help substantially in avoiding the pitting, cracking, spotting and whitening to which final laminates coated with an acrylic latex are subject.

It is therefore an object of this invention to provide coating resins for thermosetting resin-impregnated fibrous sheets, said resins having a viscosity suitable for application to said sheets by conventional means as well as the controlled rate of cure and shelf stability required to obtain smoothness and clarity in the finished laminate.

A further object is to provide laminating paper, coated with an aqueous dispersion of a resin which, when the coated laminating paper is heat- and pressure-consolidated with suitable core stock or base members, imparts a smooth, pit- and haze-free surface to a laminated article.

Accordingly, I have discovered that certain mixtures of amines will impart the proper balance of treating viscosity, shelf stability and rate of cure to acrylic latices for coating thermosetting resin-impregnated laminating paper, which attributes are requisite for smoothness and clarity in the finished laminated article. This curable coating composition comprises an aqueous dispersion of a mixture having a viscosity at 23° C. and about 30% to 60% solids of from about 200 to 3000 centipoises of (A) a reactive water-insoluble essentially linear emulsion copolymer of from about 50% to 98% by weight of a $C_1$ to $C_4$ alkyl ester of methacrylic acid and correspondingly from about 50% to 2% by weight of an acrylic acid, (B) a cross-linking amount of a compound selected from the group consisting of the polyalkyl ethers of polymethylolmelamine having a degree of methylolation and methylation between about 5 and 6 and 3,4-epoxy-6-methylcyclohexylmethyl - 3,4-epoxy-6-methylcyclohexanecarboxylate, and (C) from about 2% to 6% by weight, based on copolymer solids, of a mixture of (1) an amine selected from the group consisting of triethylamine and tripropylamine, and (2) tributylamine, in proportions by weight of (1) to (2) from about 25:75 to 75:25.

Component (A) of the curable coating composition is a reactive, water-insoluble, essentially linear vinyl emulsion copolymer prepared essentially from (a) about 50% to about 98% by weight, and preferably from about 65% to about 90% by weight, based on the total weight of monomers in the copolymer, of a $C_1$ to $C_4$ alkyl ester methacrylic acid or mixtures thereof, and (b) from about 50% to about 2% by weight, and preferably from about 35% to about 10% by weight, based on the total weight of monomers in the copolymer, of an acrylic acid, or mixtures of acrylic acids, including alkacrylic acids, haloacrylic acids, and the like.

The preferred comonomer (a) is methyl methacrylate. However, other lower alkyl methacrylates, e.g., ethyl methacrylate, propyl methacrylate, n-butyl methacrylate, isobutyl methacrylate, and the like, as well as mixtures thereof, can be employed in addition to or instead of methyl methacrylate. Similarly, comonomer (b) is preferably methacrylic acid, but other acrylic acids, e.g., acrylic acid itself, ethacrylic acid, α-chloroacrylic acid, and the like, as well as mixtures thereof, can be used in addition to or instead of methacrylic acid.

If desired, the reactive copolymer may also include (c) a $C_1$ to $C_{12}$ alkyl ester of acrylic acid such as methyl acrylate, ethyl acrylate, propyl acrylate, n-butyl acrylate, 2-ethylhexyl acrylate, octyl acrylate, dodecyl acrylate, and the like, as well as mixtures thereof. This optional comonomer can be present in the copolymer in amounts ranging from about 1% to about 45% by weight, based on the total weight of monomers in the copolymer, depending on the properties or combination of properties, e.g., hardness coupled with flexibility, desired in the final product, but preferably will be used in amounts ranging from about 5% to about 25% by weight on the above-stated basis. Furthermore, in every case the total amount of comonomers (a) and (b) or (a), (b) and (c) used will equal 100%. The term "copolymer" or "reactive copolymer" as herein employed is intended to encompass not only polymers prepared from only two different monomers but also those polymers prepared from mixtures of comonomers from each of classes (a) and (b) as well as terpolymers prepared from the comonomers of classes (a), (b) and (c).

Suitable methods for the preparation of aqueous emulsion copolymers of the type employed in practicing the present invention from monomers such as those listed hereinabove are so numerous and so well known in the art that only a brief description of such methods is deemed necessary here. In general, the selected comonomers are emulsified in water, using from about 1% to about 10% by weight, based on the total weight of monomers present, of a conventional emulsifying agent. This emulsifying agent can be non-ionic, e.g., an alkylphenoxypolyethoxyethanol having alkyl groups of from about 7 to about 18 carbon atoms in length and from about 6 to about 60 oxyethylene units, such as the heptylphenoxypolyethoxyethanols, methyloctylphenoxypolyethoxyethanols, dodecylphenoxypolyethoxyethanols, and the like; a long chain fatty acid derivative of sorbitol, such as sorbitan monolaurate, monopalmitate, monostearate, tristearate, and the like; an ethylene oxide derivative of an etherified or esterified polyhydroxy compound having a hydrophobic carbon chain, such as a polyoxyethylene sorbitan monolaurate, monopalmitate, monostearate, and the like; anionic e.g., sodium lauryl sulfonate, sodium isopropylnaphthalene sulfonate, di-2-ethylhexyl sodium sulfosuccinate, and the like, or a mixture of non-ionic and anionic emulsifying agents. Cationic emulsifying agents, due to their instability under the basic conditions to which the latex will subsequently be adjusted by addition of the amine mixture, are not particularly preferred but may be used.

The emulsified comonomers are copolymerized by means of a catalytic amount of a conventional free radical polymerization catalyst or catalyst system, e.g., an inorganic or organic peroxide such as hydrogen peroxide, t-butyl hydroperoxide, cumene hydroperoxide, and the like, an azo nitrile, such as α,α'-azobusisobutyronitrile and the like, an inorganic persulfate, sodium persulfate, potassium persulfate, and the like, or a redox catalyst system, such as sodium metabisulfite potassium persulfate and the like. The water-soluble catalyst systems are generally preferred in emulsion polymerization. The particular catalyst or catalyst system chosen can generally be used in amounts ranging from about 0.01% to about 3% by weight, based on the total weight of comonomers present. The polymerization reaction can be carried out at temperatures ranging from about 0° C. to about 100° C., preferably at from about room temperature (25° C.) to about 80° C., and the emulsion will preferably be agitated during the reaction. The resulting aqueous emulsion copolymer can have a molecular weight ranging from about 25,000 to about 1,000,000 or higher, as determined by intrinsic viscosity measurements. The amount of the reactive copolymer present in the emulsion or dispersion can be varied within wide limits, depending on such interrelated variables as, for example, the thickness desired in the surface layer or film, the solids concentration desired, etc., but in general the reactive copolymer will be present in the emulsion or dispersion in amounts ranging from about 30% to about 60% by weight, and usually from about 40% to about 50% by weight, based on the total weight of said emulsion or dispersion.

Component (B) of the curable resinous composition is a cross-linking agent selected from one of two distinct classes of compounds. The first of these classes encompasses the polyalkyl ethers of polymethylolated melamine represented by the general formula:

$$MF_xA_y$$

wherein M represents melamine, the starting material, $F_x$ represents the degree to which the melamine starting material has been methylolated, with $x$ representing a number between about 5 and 6, inclusive, and $A_y$ represents the degree to which the methylol groups of the polymethylolmelamine intermediate have been alkylated with lower alkyl groups containing from 1 to 3 carbon atoms, inclusive, i.e., methyl, ethyl and propyl groups, to provide alkoxymethyl groups containing from 2 to 4 carbon atoms, inclusive, in the highly alkylated methylol melamine final product, with $y$ representing a number between 5 and 6, inclusive, but not greater than $x$. Thus, the highly alkylated methylol melamines employed in the practice of the present invention include the hexaalkyl ethers of hexamethylolmelamine, such as hexamethoxymethylmelamine and the like, which represent the highest degree of methylolation and alkylation obtainable, the penta-alkyl ethers of hexamethylolmelamine, such as the pentamethyl ether of hexamethylolmelamine and the like, and the penta-alkyl ethers of pentamethylolmelamine, such as the pentamethyl ether of pentamethylolmelamine and the like. Furthermore, as is evident from the general formula and the value of $x$ and $y$ given above, one can use mixtures of these highly alkylated methylol melamines, e.g., a mixture of hexamethoxymethylmelamine and the pentamethyl ether of hexamethylolmelamine, as well as mixtures containing minor amounts of alkylated methylol melamines having a slightly lower degree of methylolation or alkylation. In such cases $x$ and $y$ represent average values for the degree of methylolation and alkylation. Hexamethoxymethylmelamine or mixtures containing a major amount thereof together with minor amounts of other highly methylated methylol melamines having slightly lower degrees of methylolation and methylation are preferred for use in practicing the present invention.

Highly alkylated methylol melamines are prepared by methods which are so well known in the art that it is not necessary that they be set forth herein in any great detail. In general, these conventional methods involve the basic steps of reacting melamine with aqueous formaldehyde in mol ratios ranging from about 6.5 to about 20 mols or more of formaldehyde per mol of melamine to form polymethylolmelamines; removing the bulk of the water from the thus-formed polymethylolamines, and thereafter reacting the polymethylolmelamines, under acidic conditions, with from about 10 to about 20 mols of a lower alkanol, such as methanol, ethanol, propanol, and the like, per mol of melamine starting material. Various modifications and improvements of this basic process have been developed, such as that set forth in U.S. Patent 2,918,452 to Kun et al.

The second class of cross-linking agents which can be used in combination with the above-described reactive copolymers encompasses 3,4-epoxycyclohexylmethyl-3,4-epoxycyclohexanecarboxylates, as exemplified particularly by 3,4-epoxy-6-methylcyclohexylmethyl-3,4-epoxy-6-methylcyclohexanecarboxylate. These 3,4-epoxycyclohexylmethyl-3,4-epoxycyclohexanecarboxylates as well as methods of preparation are disclosed, for example, in U.S. Patent 2,716,123.

The amount of the cross-linking agent used can range from about 5% to about 100% by weight, preferably from about 10% to about 40% by weight, based on the weight of the reactive copolymer, depending on the composition of the particular reactive copolymer employed and the conditions of temperature and pressure under which the laminating paper and final laminate are prepared. However, the thickening action and control of cure rate is essentially independent of which cross-linking agent is employed and the amount thereof. This balance of properties will be controlled substantially by the amine mixture.

Component (C) of the curable coating composition is a mixture of trialkyl monoamines comprising (1) an amine selected from the group consisting of triethylamine and tripropylamine and (2) tributylamine. The terms "tripropylamine" and tributylamine" are meant to include the isomeric forms of these compounds, e.g., tri-n-propylamine, triisopropylamine, tri-n-butylamine, triisobutylamine, etc., as well as mixtures thereof. The amine mixtures may be used in proportions by weight of (1) to (2) ranging from about 25:75 to 75:25. From about 2% to 6% by weight, based on latex copolymer solids, of the amine mixture will be employed.

The amine mixture may be added directly to the arcylic latex component (A) or to the cross-linking agent (B). However, it is preferred to blend the amine mixture with the cross-linking agent which is generally, although not necessarily, first dispersed in water. When the amine mixture is added directly to the acrylic latex, the addition is usually made in a dropwise manner.

On addition and blending of the amine mixture with the acrylic latex, the pH will adjust to at least about 7, generally to between about 7 and 9. The resulting aqueous admixture of acrylic copolymer, cross-linking agent and amine mixture will have a viscosity at 23° C. of about 30% to 60% solids of from about 200 to 3000 centipoises, preferably 1200±300 centipoises, and will maintain its treating viscosity and stability (shelf-life) for at least about 72 hours. This combination of properties permits convenient application of the admixture to thermosetting resin-impregnated fibrous sheets by conventional means over extended periods of time and contributes substantially to smoothness and clarity of the finished laminate prepared with the laminating paper. As will be shown further in the examples, the use of only one of these trialkylamines, or even admixtures of homologs, will not provide in the acrylic latex the treating viscosity, stability and retarded cure rate which effect the superior surface characteristics in finished laminates prepared with laminating paper surfaced with the coating composition of this invention. Although it is feasible to add curing catalyts such as acids or acidic materials to the coating composition at any point prior to application to the fibrous sheets, it is not preferred to do so since the resinous admixture will cure efficiently under final laminating conditions without a catalyst. If curing catalysts are employed, a preferred material is paratoluenesulfonic acid, although various other organic acids and mineral acids are suitable as well.

The fibrous sheet to be surfaced with my coating composition will not differ from those conventionally employed in the laminating art and generally comprises a fibrous material or paper printed with a decorative design and preimpregnated with a thermosetting resin. Among the suitable materials are cellulosic substances, such as high grade, absorbent, α-cellulose paper which has been printed with a design or dyed or pigmented to impart a solid color thereto. Another useful print sheet material is a sheet of fibrillated wet-spun filaments of a polymer of acrylonitrile. These acrylic fiber sheets are known in the paper making art, for example, U.S. Patents 2,810,646 and 3,047,455. Other materials are kraft paper, cotton fabrics, linen fabric, glass fiber fabric, polyester resin fibers, linear superpolyamide fibers, and the like. Printed designs having an unlimited range or form of artistic effect may be employed, so long as the inks or other coloring matter contained therein are non-bleeding in the curable resinous compositions with which the sheet is subsequently saturated and coated. In addition, the filaments making up the print sheets may contain minor amounts of such materials as are normally present in textile fibers, e.g., delusterants, antistatic agents, and the like, while the print sheets themselves may also contain minor amounts of any of the softening agents, sizes, coating materials and the like commonly employed in the manufacture of paper.

The thermosetting resins used to impregnate the fibrous sheets may be any of those commonly employed in the art for this purpose. Among these may be mentioned ethylenically unsaturated polyester resins, resins prepared from allylic compounds such as diallyl phthalate and the like, aminoplast resins such as urea-formaldehyde, guanamine-formaldehyde, melamine-formaldehyde reaction products and the like, cross-linking novolak resinous mixtures such as phenol-formaldehyde-hexamethylenetetramine products and the like; and the lower molecular weight cross-linking acrylic resinous mixtures such as a solution-polymerized methyl methacrylate/ethyl acrylate/methacrylic acid polymer containing in admixture a cross-linking agent such as hexamethoxymethylmelamine and the like.

Of the foregoing impregnating resins, the preferred materials are the aminotriazine resins, particularly melamine-formaldehyde resins. These resins as well as techniques for their preparation are well known and are shown for example in U.S. Patents 2,197,357 and 2,260,239. If desired these resins may be modified in a known manner with plasticizers as disclosed for example in U.S. Patents 2,773,848 and 2,773,788 or with curing catalysts such as mineral and organic acid and mixtures of alkyl alkylol tertiary amines, e.g., diethylethanolamine, although in most cases uncatalyzed resin will be preferred.

The extent of impregnation with the thermosetting resin is not critical. Typically, a printed sheet or foil of absorbent cellulose or regenerated cellulose paper of from about 4 to 8 mils thick will be impregnated with from about 25% to 60% by weight, preferably from about 35% to 45% by weight, based on the total dry weight of the impregnated paper, of a melamine-formaldehyde resin but various other degrees of impregnation may be observed. Following impregnation, the fibrous sheet usually will be dried to a volatile content of less than about 10% by weight, and preferably from about 3% to 6% by weight, based on the total weight of the dried impregnated sheets.

Any conventional method, e.g., dip-, brush-, flow-, roller- or spray-coating, can be used in surfacing the impregnated fibrous sheet with the coating composition of my invention. Generally, an amount of the aqueous resinous admixture will be applied to the surface of the fibrous sheet sufficient to obtain a resin pickup of from about 5 to 15 grams per square foot, based on resin solids in the admixture.

Following application of the surfacing resin, the thus-coated and impregnated fibrous sheet is dried in order to remove free water and the more volatile amine and to advance the resinous coating in cure to a point short of infusibility. This state of cure ("B-stage") is to be contrasted with the substantially complete cure or infusibility ("C-stage") imposed under the heat and pressure of the final laminating step. The drying may be carried out in one or two stages. One stage drying requires about 3 to 5 minutes at about 140° C. to 150° C. when a polyalkyl ether of polymethylolmelamine is the cross-linking agent. When a 3,4-epoxycyclohexylmethyl - 3,4-epoxy-cyclohexanecarboxylate is employed as cross-linking agent the one stage drying time will be longer and the temperature lower, e.g., about 7 minutes at 110° C., since the epoxy compound is substantially nonhydrophilic as compared to the melamine compound. The less preferable two stage drying is effected in about 10 to 30 minutes at corresponding temperatures of from about 125° C. to 65° C. followed by about 2 to 5 minutes at 140° C. to 150° C. In either case, drying above 150° C. will advance the resin too far and result, upon lamination with core or base members, in an uneven surface. However, drying temperaures should not be much lower than 65° C. since the correspondingly longer drying times would render the process uneconomical. Drying is conveniently accomplished in drying ovens or the like.

The resulting dried laminating paper may be stored for indefinite periods of time or may immediately be heat and pressure-consolidated with rigidity-imparting core or base members between stainless steel press plates or other suitable platens to form a finished laminate. A wide variety of materials are commercially available for use as core or base members. Among these may be mentioned a plurality of sheets of kraft paper impregnated throughout and bonded with a substantially completely cured phenolic resin which has been converted to the thermoset state during the initial laminating step, a pre-cured plastic laminate, such as glass fiber-reinforced thermoset polyester resin laminates and the like, a wood product, such as hardboard, woodwaste or particle boards, plywood, and the like, a mineral base board, such as cement-asbestos board, sheet rock, plaster board, and the like, or a combination of these substrates, e.g., a combination of a plurality of phenolic resin-impregnated kraft paper sheets over a piece of cement-asbestos board, a particle board, or the like. Besides laminates having only one decorative surface, balanced laminates wherein a mirror-image assembly of the decorative members is bonded to each side of a base or core member may also be prepared.

Temperatures ranging from about 150° C. to about 170° C. and pressures ranging from about 150 p.s.i. to about 1500 p.s.i., will be employed. The particular pressure employed depends in large measure upon the nature of the base or core member employed. For example, where a conventional low density substrate, e.g., flakeboard, plywood and the like, is used, pressures ranging from about 150 to about 350 p.s.i., and preferably from about 250 to about 300 p.s.i., will be used. Conversely, when a conventional high density substrate, e.g., a plurality of sheets of phenolic resin-impregnated paper, a cement-asbestos board, and the like, is used, pressures ranging from about 600 to about 1500 p.s.i., and preferably from about 1100 to about 1200 p.s.i., will generally be employed. The time required to effect substantially complete cure ("C-stage") of the resinous components of the assembly when employing temperatures and pressures within the above-stated ranges will usually be from about 15 minutes to about 45 minutes. The resulting laminate is generally allowed to cool to a temperature of less than about 50° C., and preferably to room temperature, before being removed from the press.

In order that those skilled in the art may more fully understand the inventive concept presented herein, the following examples are set forth. These examples are given primarily for illustration, and should not be considered as expressing limitations unless so set forth in the appended claims. All parts and percentages are by weight unless otherwise stated.

EXAMPLE 1

A latex polymer is prepared by conventional means using as monomers methyl methacrylate, ethyl acrylate, and methacrylic acid in a weight ratio of 80/10/10, respectively. The monomer mixture is added slowly to a dilute aqueous dispersion of surfactants and ammonium persulfate catalyst at 60° C. to 80° C. There results from this known procedure a stable latex terpolymer containing about 43% solids.

To this latex mixture is added 4.4% by weight based on latex solids of a mixture of triethylamine and tri-n-butylamine in a weight ratio of 25/75, respectively, and 30 parts of 3,4-epoxy-6-methylcyclohexylmethyl-3,4-epoxy-6-methylcyclohexanecarboxylate for each 100 parts of latex solids. The solution is mixed thoroughly and allowed to thicken. Thickening to 1200±300 centipoises (23° C., 53.6% solids) occurs in about 1 hour and the dispersion is stable and retains its treating viscosity well in excess of 72 hours. The thickened mixture is then roller-coated onto cellulosic paper printed with a decorative pattern and pre-impregnated with a commercially available melamine-formaldehyde resin. About 9 to 10 grams of latex solids is applied per square foot of fibrous print paper. The thus-coated laminating paper is then dried in an oven for 4 to 5 minutes at 145° C. to 150° C.

The acrylic latex coated decorative laminating paper is thereafter used as the surface of a decorative laminate suitable for outdoor use by pressing it together with a commercially available substrate comprising a plurality of kraft paper sheets impregnated with a phenolic resin between the polished platens of a laminating press for 30 minutes at 160° C. and 1100 p.s.i. The finished laminate displays a smooth, hard, clear, glossy surface free of pits and cracks and is highly resistant to scratching, abrasion and solvent action. Moreover, when exposed to steam for one-half hour (by fixing a laminate specimen, decorative surface down, one inch above a vessel half-filled with boiling water) the surfaces show no blistering, delamination or whitening.

EXAMPLE 2

To the same acrylic latex copolymer employed in Example 1 (about 43% resin solids in water) there is added 5% by weight based on resin solids of a mixture of tri-n-propylamine (boiling point 156° C.) and tri-n-butylamine in a weight ratio of 25/75, respectively, followed by 30% by weight based on resin solids of 3,4-epoxy-6-methylcyclohexylmethyl - 3,4 - epoxy - 6 - methylcyclohexanecarboxylate. Upon thorough mixing the dispersion thickens to a viscosity of about 1200±300 centipoises (23° C., 53.6% solids) and maintains its treating viscosity upwards of 72 hours.

By means of a roller, about 9 to 10 grams of the resinous admixture based on resin solids is applied per square foot to the surface of an α-cellulose fibrous sheet previously impregnated with a commercially available melamine-formaldehyde resin and which has been printed with a decorative design. This coated assembly is then conveniently dried and advanced in cure in an oven for about 4 minutes at 150° C. The resulting laminating paper may be stored for later use or may be immediately heat- and pressure-consolidated with conventional backing members, e.g., a plurality of kraft paper sheets containing a phenolic resin binder, under suitable laminating conditions, e.g., 30 minutes at 160° C. and 1100 p.s.i. The finished outdoor laminate is hard, smooth, glossy, and highly resistant to marring, solvent action, and the whitening, spotting and delamination often induced by steam.

EXAMPLES 3-4

With the exception of the substitution of the same amount of hexamethoxymethylmelamine for the epoxy cross-linking agent, coating compositions substantially identical to those employed in Examples 1 and 2 are applied in substantially the same manner to melamine-formaldehyde resin-impregnated print sheets and the dried laminating paper then heat- and pressure-consolidated with particle board core stock. Results substantially equivalent to those of the foregoing examples are obtained.

COMPARATIVE EXAMPLES 5-11

To the acrylic latex copolymer of Example 1 there was added 30% by weight based on latex solids of hexamethoxymethylmelamine and, in separate runs, the amounts of amines or amine mixtures set forth in Table I below. Amounts of cross-linking agent and amines are based on acrylic latex solids. In each case mixing with the acrylic latex was aided somewhat by first blending the cross-linking agent and amine(s) and then adding this mixture to the latex copolymer. The results on admixing are shown. In examples where laminating paper and final laminates could be prepared, viscosity of the coating composition was 1200±300 centipoises (23° C., 53% solids), about 8-9 grams of coating composition was applied per square foot of print paper, drying was at 145-150° C. for 3 minutes, and lamination was effected onto flakeboard at 160° C. and 300 p.s.i. for 30 minutes. Examples 5, 6 and 8-11 show the ineffectiveness of ammonia or amines used alone with the acrylic latex. In particular, di-n-butylamine, which has a boiling point intermediate that of triethylamine and tri-n-butylamine and very close to that of tri-n-propylamine (boiling point 156° C.), will not work alone. In each example, thickening was insufficient, the mixture turned lumpy, or the additive was either too volatile (causing premature cure) or not volatile enough (thereby extending the drying and laminating periods and substantially minimizing the efficiency of laminate preparations). So far as is known only the amine mixtures herein disclosed provide the beneficial thickening action and cure retardance required in acrylic latex copolymer compositions for efficient preparation of laminating paper and final laminate assemblies.

Table I

| Comparative Examples | Amine Additive | Results |
|---|---|---|
| 5 | 5% tri-n-butylamine (boiling point 214° C.). | No thickening action. |
| 6 | 5% triethylamine (boiling point 89.5° C.). | Good thickening but lumpy even when added dropwise to cross-linking agent prior to mixing with latex. Could not be spread smoothly on print paper. |
| 7 | 3% 10/90 mixture of di-n-butylamine and tri-n-butylamine. | Immediate coagulation. |
| 8 | 3% di-n-butylamine (boiling point 159-161° C.). | Immediate coagulation. |

Table I—Continued

| Comparative Examples | Amine Additive | Results |
|---|---|---|
| 9 | 4%-5% NH₄OH solution. | Mixture lump-free but when used to surface melamine resin-impregnated print paper and laminated onto flakeboard substrate, finished laminate was pitted and uneven due to loss of the ammonia during advancement and drying of the laminating paper and consequent premature cure. |
| 10 | 3% monoethanolamine (boiling point 150-176° C.). | Good thickening but volatilized too slowly in final laminating step for economical operation. |
| 11 | 3% trimethylamine (boiling point 3.5° C.) water solution. | Due to the high volatility of the amine, results substantially equivalent to those observed in Example 9 (NH₄OH) can be expected. |

I claim:

1. A curable coating composition comprising an aqueous dispersion of a mixture of
   (A) a reactive water-insoluble essentially linear emulsion copolymer of from about 50% to 98% by weight of a $C_1$ to $C_4$ alkyl ester of methacrylic acid and correspondingly from about 50% to 2% by weight of an acrylic acid,
   (B) a cross linking amount of a compound selected from the group consisting of the polyalkyl ethers of polymethylolmelamine having a degree of methylolation and methylation between about 5 and 6 and 3,4-epoxy-6-methylcyclohexylmethyl-3,4-epoxy-6-methylcyclohexanecarboxylate, and
   (C) from about 2% to 6% by weight based on copolymer solids of a mixture of
      (1) an amine selected from the group consisting of triethylamine and tripropylamine, and
      (2) tributylamine, in proportions by weight of (1) to (2) of from about 25:75 to 75:25.

2. A curable coating composition comprising an aqueous dispersion of a mixture of
   (A) a reactive water-insoluble essentially linear emulsion copolymer of from about 50% to 98% by weight of a $C_1$ to $C_4$ alkyl ester of methacrylic acid and correspondingly from about 50% to 2% by weight of an acrylic acid,
   (B) a cross-linking amount of a compound selected from the group consisting of the polyalkyl ethers of polymethylolmelamine having a degree of methylolation and methylation between about 5 and 6 and 3,4-epoxy-6-methylcyclohexylmethyl-3,4-epoxy-6-methylcyclohexanecarboxylate, and
   (C) from about 2% to 6% by weight based on copolymer solids of a mixture of
      (1) triethylamine and
      (2) tributylamine in proportions by weight of (1) to (2) of from about 25:75 to 75:25.

3. A curable coating composition comprising an aqueous dispersion of a mixture of
   (A) a reactive water-insoluble essentially linear emulsion copolymer of from about 50% to 98% by weight of a $C_1$ to $C_4$ alkyl ester of methacrylic acid and correspondingly from about 50% to 2% by weight of an acrylic acid,
   (B) a cross-linking amount of a compound selected from the group consisting of the polyalkyl ethers of polymethylolmelamine having a degree of methylolation and methylation between about 5 and 6 and 3,4-epoxy-6-methylcyclohexylmethyl-3,4-epoxy-6-methylcyclohexanecarboxylate, and
   (C) from about 2% to 6% by weight based on copolymer solids of a mixture of
      (1) tripropylamine and
      (2) tributylamine in proportions by weight of (1) to (2) of from about 25:75 to 75:25.

4. A curable coating composition comprising an aqueous dispersion of a mixture of
   (A) a reactive water-insoluble essentially linear emulsion terpolymer of from about 50% to 98% by weight of a $C_1$ to $C_4$ alkyl ester of methacrylic acid, from about 1% to 50% by weight of an acrylic acid, and from about 1% to 45% by weight of a $C_1$ to $C_{12}$ alkyl ester of acrylic acid, wherein the sum of the weights of said monomers is 100%,
   (B) a cross-linking amount of a compound selected from the group consisting of the polyalkyl ethers of polymethylolmelamine having a degree of methylolation and methylation between about 5 and 6 and 3,4-epoxy-6-methylcyclohexylmethyl-3,4-epoxy-6-methylcyclohexanecarboxylate, and
   (C) from about 2% to 6% by weight based on copolymer solids of a mixture of
      (1) an amine selected from the group consisting of triethylamine and tripropylamine, and
      (2) tributylamine, in proportions by weight of (1) to (2) of from about 25:75 to 75:25.

5. A curable coating composition comprising an aqueous dispersion of a mixture of
   (A) a reactive water-insoluble essentially linear emulsion terpolymer of from about 50% to 98% by weight of a $C_1$ to $C_4$ alkyl ester of methacrylic acid, from about 1% to 50% by weight of an acrylic acid, and from about 1% to 45% by weight of a $C_1$ to $C_{12}$ alkyl ester of acrylic acid, wherein the sum of the weights of said monomers is 100%,
   (B) a cross-linking amount of a compound selected from the group consisting of the polyalkyl ethers of polymethylolmelamine having a degree of methylolation and methylation between about 5 and 6 and 3,4-epoxy-6-methylcyclohexylmethyl-3,4-epoxy-6-methylcylohexanecarboxylate, and
   (C) from about 2% to 6% by weight based on copolymer solids of a mixture of
      (1) triethylamine and
      (2) tributylamine in proportions by weight of (1) to (2) of from about 25:75 to 75:25.

6. A curable coating composition comprising an aqueous dispersion of a mixture of
   (A) a reactive water-insoluble essentially linear emulsion copolymer of from about 50% to 98% by weight of a $C_1$ to $C_4$ alkyl ester of methacrylic acid, from about 1% to 50% by weight of an acrylic acid, and from about 1% to 45% by weight of a $C_1$ to $C_{12}$ alkyl ester of acrylic acid, wherein the sum of the weights of said monomers is 100%,
   (B) a cross-linking amount of a compound selected from the group consisting of the polyalkyl ethers of polymethylolmelamine having a degree of methylolation and methylation between about 5 and 6 and 3,4-epoxy-6-methylcyclohexylmethyl-3,4-epoxy-6-methylcyclohexanecarboxylate, and
   (C) from about 2% to 6% by weight based on copolymer solids of a mixture of
      (1) tripropylamine and
      (2) tributylamine in proportions by weight of (1) to (2) of from about 25:75 to 75:25.

7. A curable coating composition comprising an aqueous dispersion of a mixture of
   (A) a reactive water-insoluble essentially linear emulsion copolymer of from about 65% to 90% by weight of methyl methacrylate, from about 10% to 35% by weight of methacrylic acid, and from about 5% to 25% by weight of ethyl acrylate, wherein the sum of the weights of said monomers is 100%,
   (B) a cross-linking amount of hexamethoxymethylmelamine, and
   (C) from about 2% to 6% by weight based on copolymer solids of a mixture of
      (1) triethylamine and
      (2) tributylamine in proportions by weight of (1) to (2) of from about 25:75 to 75:25.

8. A curable coating composition comprising an aqueous dispersion of a mixture of
   (A) a reactive water-insoluble essentially linear emulsion copolymer of from about 65% to 90% by weight of methyl methacrylate, from about 10% to 35% by weight of methacrylic acid, and from about 5% to 25% by weight of ethyl acrylate, wherein the sum of the weights of said monomers is 100%,
   (B) a cross-linking amount of hexamethoxymethylmelamine, and
   (C) from about 2% to 6% by weight based on copolymer solids of a mixture of
      (1) tripropylamine and
      (2) tributylamine in proportions by weight of (1) to (2) of from about 25:75 to 75:25.

9. Laminating paper comprising a thermosetting resin-impregnated fibrous sheet coated with a resinous composition advanced in cure to a stage short of infusibility, said resinous composition prior to said advancement comprising a mixture of
   (A) a reactive water-insoluble essentially linear emulsion copolymer of from about 50% to 98% by weight of a $C_1$ to $C_4$ alkyl ester of methacrylic acid and correspondingly from about 50% to 2% by weight of an acrylic acid,
   (B) a cross-linking amount of a compound selected from the group consisting of the polyalkyl ethers of polymethylolmelamine having a degree of methylolation and methylation between about 5 and 6 and 3,4-epoxy-6-methylcyclohexylmethyl-3,4-epoxy-6-methylcyclohexanecarboxylate, and
   (C) from about 2% to 6% by weight based on copolymer solids of a mixture of
      (1) an amine selected from the group consisting of triethylamine and tripropylamine, and
      (2) tributylamine, in proportions by weight of (1) to (2) of from about 25:75 to 75:25.

10. Laminating paper comprising a thermosetting resin-impregnated fibrous sheet coated with a resinous composition advanced in cure to a stage short of infusibility, said resinous composition prior to said advancement comprising a mixture of
   (A) a reactive water-insoluble essentially linear emulsion copolymer of from about 50% to 98% by weight of a $C_1$ to $C_4$ alkyl ester of methacrylic acid and correspondingly from about 50% to 2% by weight of an acrylic acid,
   (B) a cross-linking amount of a compound selected from the group consisting of the polyalkyl ethers of polymethylolmelamine having a degree of methylolation and methylation between about 5 and 6 and 3,4-epoxy-6-methylcyclohexylmethyl-3,4-epoxy-6-methylcyclohexanecarboxylate, and
   (C) from about 2% to 6% by weight based on copolymer solids of a mixture of
      (1) triethylamine and
      (2) tributylamine in proportions by weight of (1) to (2) of from about 25:75 to 75:25.

11. Laminating paper comprising a thermosetting resin-impregnated fibrous sheet coated with a resinous composition advanced in cure to a stage short of infusibility, said resinous composition prior to said advancement comprising a mixture of
   (A) a reactive water-insoluble essentially linear emulsion copolymer of from about 50% to 98% by weight of a $C_1$ to $C_4$ alkyl ester of methacrylic acid and correspondingly from about 50% to 2% by weight of an acrylic acid,
   (B) a cross-linking amount of a compound selected from the group consisting of the polyalkyl ethers of polymethylolmelamine having a degree of methylolation and methylation between about 5 and 6 and 3,4 - epoxy - 6 - methylcyclohexylmethyl-3,4-epoxy-6-methylcyclohexanecarboxylate, and
(C) from about 2% to 6% by weight based on copolymer solids of a mixture of
(1) tripropylamine and
(2) tributylamine in proportions by weight of (1) to (2) of from about 25:75 to 75:25.

12. Laminating paper comprising a thermosetting resin-impregnated fibrous sheet coated with a resinous composition advanced in cure to a stage short of infusibility, said resinous composition prior to said advancement comprising a mixture of
(A) a reactive water-insoluble essentially linear emulsion terpolymer of from about 50% to 98% by weight of a $C_1$ to $C_4$ alkyl ester of methacrylic acid, from about 1% to 50% by weight of an acrylic acid, and from about 1% to 45% by weight of a $C_1$ to $C_{12}$ alkyl ester of acrylic acid, wherein the sum of the weights of said monomers is 100%,
(B) a cross-linking amount of a compound selected from the group consisting of the polyalkyl ethers of polymethylolmelamine having a degree of methylolation and methylation between about 5 and 6 and 3,4 - epoxy - 6 - methylcyclohexylmethyl-3,4-epoxy-6-methylcyclohexanecarboxylate, and
(C) from about 2% to 6% by weight based on copolymer solids of a mixture of
(1) an amine selected from the group consisting of triethylamine and tripropylamine, and
(2) tributylamine, in proportions by weight of (1) to (2) of from about 25:75 to 75:25.

13. Laminating paper comprising a thermosetting resin-impregnated fibrous sheet coated with a resinous composition advanced in cure to a stage short of infusibility, said resinous composition prior to said advancement comprising a mixture of
(A) a reactive water-insoluble essentially linear emulsion terpolymer of from about 50% to 98% by weight of a $C_1$ to $C_4$ alkyl ester of methacrylic acid, from about 1% to 50% by weight of an acrylic acid, and from about 1% to 45% by weight of a $C_1$ to $C_{12}$ alkyl ester of acrylic acid, wherein the sum of the weights of said monomers is 100%.
(B) a cross-linking amount of a compound selected from the group consisting of the polyalkyl ethers of polymethylolmelamine having a degree of methylolation and methylation between about 5 and 6 and 3,4-epoxy - 6 - methylcyclohexylmethyl - 3,4 - epoxy-6-methylcyclohexanecarboxylate,
(C) from about 2% to 6% by weight based on copolymer solids of a mixture of
(1) triethylamine and
(2) tributylamine in proportions by weight of (1) to (2) of from about 25:75 to 75:25.

14. Laminating paper comprising a thermosetting resin-impregnated fibrous sheet coated with a resinous composition advanced in cure to a stage short of infusibility, said resinous composition prior to said advancement comprising a mixture of
(A) a reactive water-insoluble essentially linear emulsion copolymer of from about 50% to 98% by weight of a $C_1$ to $C_4$ alkyl ester of methacrylic acid, from about 1% to 50% by weight of an acrylic acid, and from about 1% to 45% by weight of a $C_1$ to $C_{12}$ alkyl ester of acrylic acid, wherein the sum of the weights of said monomers is 100%.
(B) a cross-linking amount of a compound selected from the group consisting of the polyalkyl ethers of polymethylolmelamine having a degree of methylolation and methylation between about 5 and 6 and 3,4- epoxy - 6 - methylcyclohexylmethyl - 3,4 - epoxy-6-methylcyclohexanecarboxylate, and
(C) from about 2% to 6% by weight based on copolymer solids of a mixture of
(1) tripropylamine and
(2) tributylamine in proportions by weight of (1) to (2) of from about 25:75 to 75:25.

15. Laminating paper comprising a thermosetting resin-impregnated fibrous sheet coated with a resinous composition advanced in cure to a state short of infusibility, said resinous composition prior to said advancement comprising a mixture of
(A) a reactive water-insoluble essentially linear emulsion copolymer of from about 65% to 90% by weight of methyl methacrylate, from about 10% to 35% by weight of methacrylic acid, and from about 5% to 25% by weight of ethyl acrylate, wherein the sum of the weights of said monomers is 100%.
(B) a cross-linking amount of hexamethoxymethylmelamine, and
(C) from about 2% to 6% by weight based on copolymer solids of a mixture of
(1) triethylamine and
(2) tributylamine in proportions by weight of (1) to (2) of from about 25:75 to 75:25.

16. Laminating paper comprising a thermosetting resin-impregnated fibrous sheet coated with a resinous composition advanced in cure to a state short of infusibility, said resinous composition prior to said advancement comprising a mixture of
(A) a reactive water-insoluble essentially linear emulsion copolymer of from about 65% to 90% by weight of methyl methacrylate, from about 10% to 35% by weight of methacrylic acid, and from about 5% to 25% by weight of ethyl acrylate, wherein the sum of the weights of said monomers is 100%.
(B) a cross-linking amount of hexamethoxymethylmelamine, and
(C) from about 2% to 6% by weight based on copolymer solids of a mixture of
(1) tripropylamine and
(2) tributylamine in proportions by weight of (1) to (2) of from about 25:75 to 75:25.

17. A unitary heat- and pressure-consolidated laminated article which comprises
(I) a rigidity imparting base member and bonded thereto
(II) a surface member comprising a substantially thermoset resin-impregnated fibrous sheet coated on the exposed surface with a substantially thermoset composition, said coating prior to substantial advancement in cure comprising a mixture of
(A) a reactive water-insoluble essentially linear emulsion copolymer of from about 50% to 98% by weight of a $C_1$ to $C_4$ alkyl ester of methacrylic acid and correspondingly from about 50% to 2% by weight of an acrylic acid,
(B) a cross-linking amount of a compound selected from the group consisting of the polyalkyl ethers of polymethylolmelamine having a degree of methylolation and methylation between about 5 and 6 and 3,4-epoxy-6-methylcyclohexylmethyl-3,4-epoxy-6 - methylcyclohexanecarboxylate, and
(C) from about 2% to 6% by weight based on copolymer solids of a mixture of
(1) an amine selected from the group consisting of triethylamine and tripropylamine, and
(2) tributylamine, in proportions by weight of (1) to (2) of from about 25:75 to 75:25.

18. A unitary heat- and pressure-consolidated laminated article which comprises
(I) a rigidity imparting base member and bonded thereto
(II) a surface member comprising a substantially thermoset resin-impregnated fibrous sheet coated on the exposed surface with a substantially thermoset composition, said coating prior to substantial advancement in cure comprising a mixture of (A) a reactive water-insoluble essentially linear emulsion copolymer of from about 50% to 98% by weight of a $C_1$ to $C_4$ alkyl ester of methacrylic acid and correspondingly from about 50% to 2% by weight of an acrylic acid, (B) a cross-linking amount of a compound selected from the group consisting of the polyalkyl ethers of polymethylolmelamine having a degree of methylolation and methylation between about 5 and 6 and 3,4-epoxy-6-methylcyclohexylmethyl-3,4-epoxy-6 - methylcyclohexanecarboxylate, and (C) from about 2% to 6% by weight based on copolymer solids of a mixture of
  (1) triethylamine and
  (2) tributylamine in proportions by weight of (1) to (2) of from about 25:75 to 75:25.

19. A unitary heat- and pressure-consolidated laminated article which comprises (I) a rigidity imparting base member and bonded thereto (II) a surface member comprising a substantially thermoset resin-impregnated fibrous sheet coated on the exposed surface with a substantially thermoset composition, said coating prior to substantial advancement in cure comprising a mixture of (A) a reactive water-insoluble essentially linear emulsion copolymer of from about 50% to 98% by weight of a $C_1$ to $C_4$ alkyl ester of methacrylic acid and correspondingly from about 50% to 2% by weight of an acrylic acid, (B) a cross-linking amount of a compound selected from the group consisting of the polyalkyl ethers of polymethylolmelamine having a degree of methylolation and methylation between about 5 and 6 and 3,4-epoxy-6-methylcyclohexylmethyl-3,4-epoxy-6 - methylcyclohexanecarboxylate, and (C) from about 2% to 6% by weight based on copolymer solids of a mixture of
  (1) tripropylamine and
  (2) tributylamine in proportions by weight of (1) to (2) of from about 25:75 to 75:25.

20. A unitary heat- and pressure-consolidated laminated article which comprises (I) a rigidity imparting base member and bonded thereto (II) a surface member comprising a substantially thermoset resin-impregnated fibrous sheet coated on the exposed surface with a substantially thermoset composition, said coating prior to substantial advancement in cure comprising a mixture of (A) a reactive water-insoluble essentially linear emulsion terpolymer of from about 50% to 98% by weight of a $C_1$ to $C_4$ alkyl ester of methacrylic acid, from about 1% to 50% by weight of an acrylic acid, and from about 1% to 45% by weight of a $C_1$ to $C_{12}$ alkyl ester of acrylic acid, wherein the sum of the weights of said monomers is 100%, (B) a cross-linking amount of a compound selected from the group consisting of the polyalkyl ethers of polymethylolmelamine having a degree of methylolation and methylation between about 5 and 6 and 3,4-epoxy-6-methylcyclohexylmethyl-3,4-epoxy-6 - methylcyclohexanecarboxylate, and (C) from about 2% to 6% by weight based on copolymer solids of a mixture of
  (1) an amine selected from the group consisting of triethylamine and tripropylamine, and
  (2) tributylamine, in proportions by weight of (1) to (2) of from about 25:75 to 75:25.

References Cited by the Examiner

UNITED STATES PATENTS

| | | | |
|---|---|---|---|
| 3,057,812 | 10/1962 | Straugham et al. | 260—836 |
| 3,107,227 | 10/1963 | Suen et al. | 260—29.4 |
| 3,215,756 | 11/1965 | Lombardi et al. | 260—836 |
| 3,220,916 | 11/1965 | Petropoulos | 260—836 |

MURRAY TILLMAN, *Primary Examiner.*

J. C. BLEUTGE, *Assistant Examiner.*